United States Patent [19]

Freze

[11] 3,966,441
[45] June 29, 1976

[54] LINT DISPOSAL APPARATUS

[75] Inventor: Benjamin H. Freze, Garden Grove, Calif.

[73] Assignee: Challenge-Cook Bros., Incorporated, City of Industry, Calif.

[22] Filed: Sept. 30, 1974

[21] Appl. No.: 510,369

Related U.S. Application Data

[63] Continuation-in-part of Ser. No. 257,018, May 25, 1972, abandoned.

[52] U.S. Cl. .................................. 55/290; 34/82; 55/302; 55/400; 55/466; 55/487; 432/72
[51] Int. Cl.² ........................................ B01D 46/26
[58] Field of Search ............ 55/290, 302, 400, 466, 55/487; 34/81, 82, 72, 133; 432/72

[56] References Cited
UNITED STATES PATENTS

| 574,990 | 1/1897 | Griffin | 55/400 |
| 2,169,435 | 8/1939 | Simpson | 55/290 |
| 2,648,396 | 8/1953 | Kirby | 55/400 |
| 3,013,628 | 12/1961 | Jacobs | 55/466 |
| 3,132,006 | 5/1964 | Brucken | 34/79 |
| 3,395,972 | 8/1968 | Hardison | 55/466 |

FOREIGN PATENTS OR APPLICATIONS

| 666,039 | 2/1952 | United Kingdom | 34/82 |
| 288,451 | 10/1965 | U.S.S.R. | 432/72 |

Primary Examiner—Bernard Nozick
Attorney, Agent, or Firm—Lyon and Lyon

[57] ABSTRACT

A lint disposal apparatus wherein lint or other combustible particulate matter entrained in a column of air moving in a duct is held by opposing forces contiguous to the radially outer surface of a rotating screen against which a flame is directed to cause the particulate matter to be ignited as it passes through the flame.

10 Claims, 12 Drawing Figures

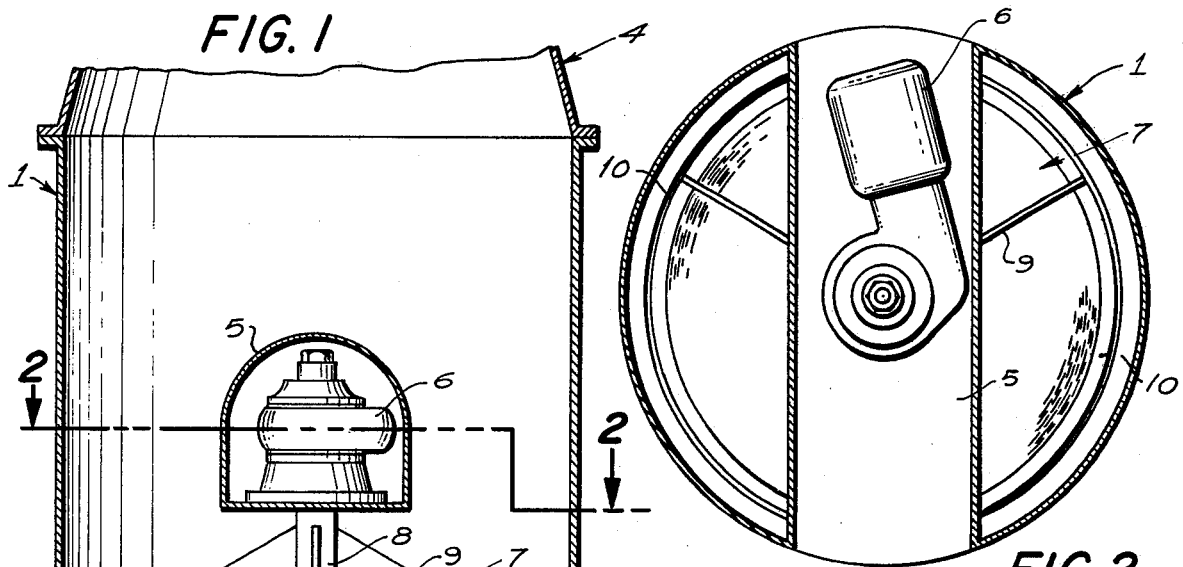
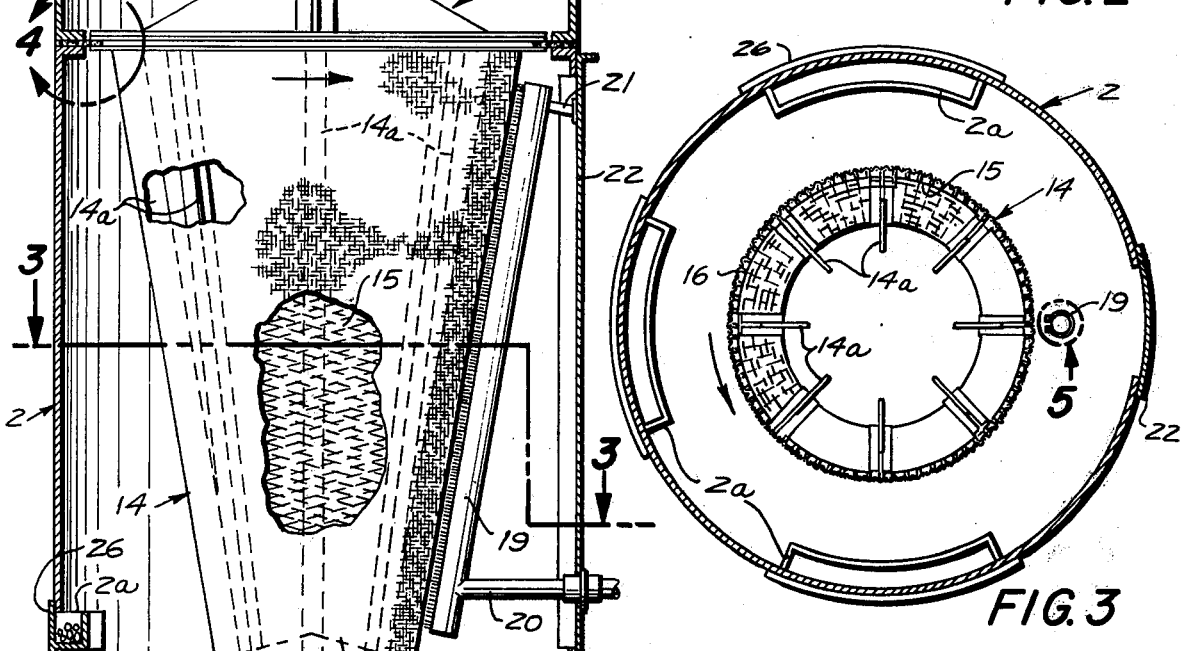
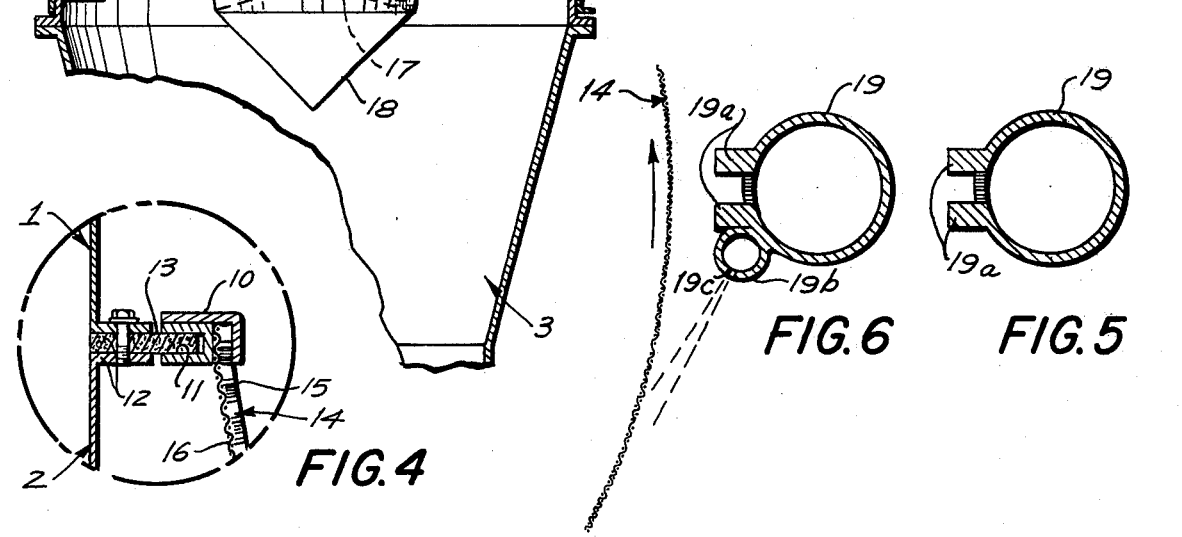

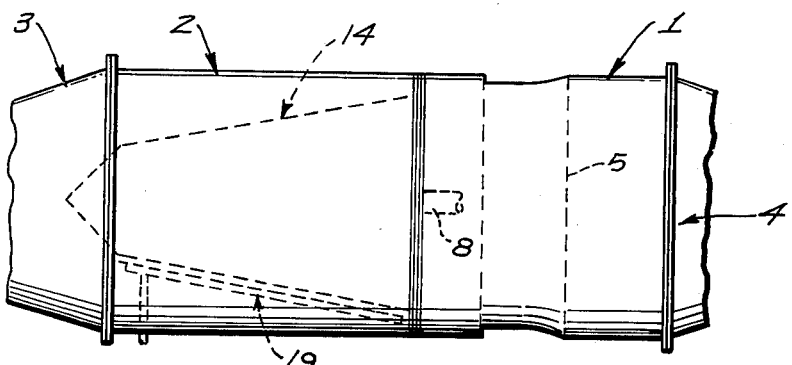
FIG. 7
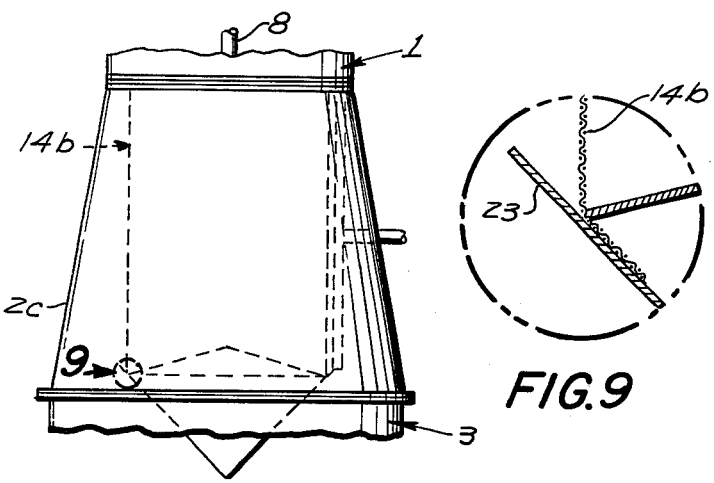
FIG. 8
FIG. 9
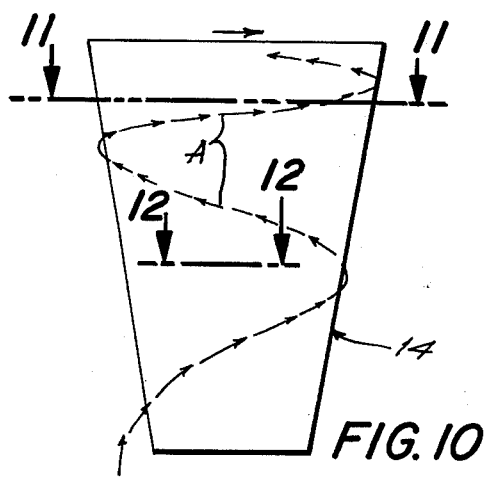
FIG. 10
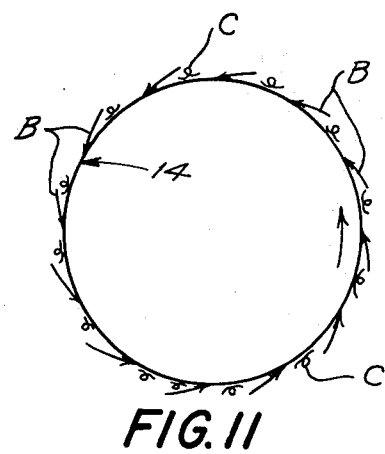
FIG. 11
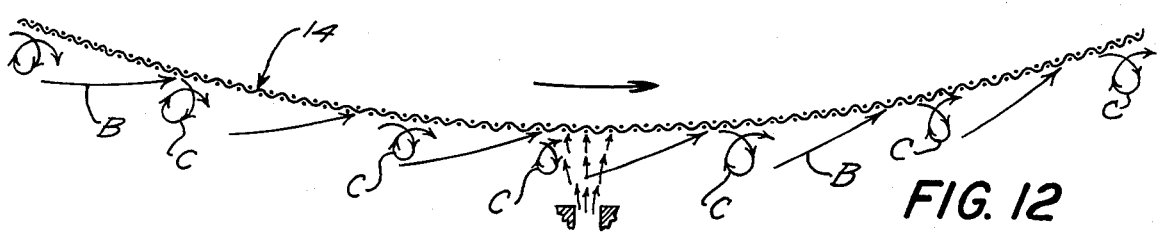
FIG. 12

3,966,441

LINT DISPOSAL APPARATUS

This application is a continuation-in-part application of Ser. No. 257,018 filed May 25, 1972, now abandoned, for Lint Disposal Apparatus.

SUMMARY OF THE INVENTION

The present invention is directed to a lint disposal apparatus which overcomes the problems inherent in lint collectors and is summarized in the following objects:

First, to provide a lint disposal apparatus which continuously burns lint and other combustible particulate matter held in suspension in an air stream contiguous to a rotating screen.

Second, to provide a lint disposal apparatus located in a duct leading from a source of lint, such as a clothes drier, which utilizes a rotating screen interposed in the path of movement of lint laden air and toward which ignition heat is directed, the rate of movement of the screen being such that heating of the screen itself is minimized.

Third, to provide a lint disposal apparatus, as indicated in the other objects, wherein the lint is almost totally consumed, most of what small amount of ash which tends to collect on the screen being periodically removed by air jet action, thus eliminating any build-up of residue which would clog the screen and permitting the use of a finer screen than that which would otherwise be used, with the result that contamination of the discharging air is reduced to a minimum, well below the contaminate level of air discharged from conventional lint collector systems.

Fourth, to provide a lint disposal apparatus which eliminates the need for frequent cleaning of large accumulations of lint and the costly labor service required for removing and disposing of large, bulky masses of lint; the cleaning service being confined to infrequent removal of carbon residue and small quantities of incombustible matter as may collect in removable traps.

Fifth, to provide a lint disposal apparatus, as indicated in the other objects, which by consuming the lint rather than collecting the lint eliminates bulky and costly collectly apparatus such as the conventional "lint house" or messy spray systems; instead, the disposal apparatus is compact, and light of weight which enhances its installation flexibly, and permits the use of a single disposal unit coupled to a plurality of lint sources.

Sixth, to provide an apparatus which, while particularly adapted for the continuous disposal of lint, is also applicable to the continuous disposal of other combustible particulate matter such as flour dust, or wood dust.

Seventh, to provide a lint disposal apparatus wherein a screen structure is rotated at a rate to produce a surface speed and centrifugal force for continuously urging the lint away from its external surface in opposition to the force of the flow of air toward and through the screen structure thereby causing numerous eddy currents to form contiguous to the screen structure which tends to hold the lint in suspension contiguous to the screen structure so as to rotate therewith progressively into a heated zone extending longitudinally of the screen to consume the lint, the rate of movement also being such that heating of the screen structure is minimized.

DESCRIPTION OF THE FIGURES

FIG. 1 is a fragmentary longitudinal sectional view of the lint disposal apparatus.

FIG. 2 is a transverse sectional view taken through 2—2 of FIG. 1.

FIG. 3 is a transverse sectional view taken through 3—3 of FIG. 1.

FIG. 4 is an enlarged fragmentary sectional view taken within circle 4 of FIG. 1.

FIG. 5 is an enlarged sectional view of the lint burner taken within circle 5 of FIG. 3.

FIG. 6 is a similar enlarged sectional view of a modified burner coupled with a residue cleaner, and indicating a portion of the lint screen.

FIG. 7 is an essentially diagrammatical side view showing the disposal apparatus in a horizontal position.

FIG. 8 is an essentially diagrammatical side view showing another embodiment in which the lint entraining cage is cylindrical.

FIG. 9 is an enlarged fragmentary sectional view taken within circle 9 of FIG. 8.

FIG. 10 is a diagrammatical side view of the embodiment of the lint screen shown in FIGS. 1 through 6, showing the spiral pattern of movement of air and lint.

FIG. 11 is a diagrammatical cross sectional view of the lint screen taken in the plane 11—11 of FIG. 10 showing the relative movement of lint screen and lint.

FIG. 12 is an exaggerated diagrammatical and fragmentary sectional view to suggest the manner in which lint is suspended contiguous to the surface of the screen for consumption by the burner.

Reference is first directed to FIGS. 1 through 4. The lint disposal apparatus is contained within a cylindrical shell, which may be divided into an upper section 1 and lower section 2. The lower end of the shell is connected to an entrance duct 3 and the upper end to a discharge duct 4.

The upper shell section is provided with a cross tube 5, the lower side of which is flat and serves to support a motor and speed reduction unit 6, having a downwardly directed shaft. Mounted on the shaft is a supporting wheel or spider 7 comprising a hub 8, radiating webs 9 and a rim 10. Forming a part of or carried by the rim 10 is an annular channel member 11 facing radially outward, as shown in FIG. 4.

The adjacent ends of the shell sections 1 and 2 are provided with inturned clamping flanges 12 which clamp an annular seal ring 13, formed of asbestos or glass cloth appropriately bonded together by a temperature resistant material. The radially inner margin of the seal ring is received in the annular channel member 11, as shown best in FIG. 4.

Suspended from the supporting wheel 7 is a lint entraining cage or screen structure 14 which, in the embodiment shown in FIGS. 1 through 4 is conical and forms with the lower section 2 of the shell an outer, inlet chamber and forms internally an outlet chamber communicatively with the upper section 1 of the shell. The cage 14 includes an inner screen 15 which may be formed of expanded metal and having relatively large openings. The inner screen 15 forms a backing member for an outer screen 16 of relatively fine mesh, in fact, sufficiently fine as to prevent the passage therethrough of fine particulate matter such as clothes lint. Within the cage 14 is a supporting frame comprising a set of inwardly directed vanes 14a which rotates with the cage 14 to maintain rotary movement of the air passing through the cage 14.

The lower or smaller end of the cage is closed by an upwardly directed conical bottom member 17. Externally, the cage is provided with a downwardly directed deflector cone 18.

One or more arcuate collector cups 2a are disposed in the wall of the shell 2 below, but radially outward from the screen structure 14. Each collector cup includes a mounting flange 26 externally of the shell to permit ready removal.

The entrance duct 3 is connected to the discharge side of a clothes drier or group of clothes driers or other equipment, not shown, from which air and combustible particulate matter, such as lint, is discharged. The air may be discharged under pressure by a blower associated with the drier or the like, in which case the air with its particulate matter flows upwardly from the duct 3 into the space surrounding the cage 14. The seal ring 13 prevents any significant flow past the cage; instead, the air is directed through the screen 16 into the interior of the cage which is open to the shell section 2 and the discharge duct 4. Alternatively, a blower, not shown, may be located above the discharge duct 4 so that the air is below ambient pressure instead of above ambient pressure.

Mounted outside the cage is contiguous parallel relationship to the outer screen 16 is a vertically directed burner tube 19 connected to a supply line 20, which supports the lower end thereof. The upper end of the burner tube may be supported by a mounting bracket 21. If desired, the burner tube, supply line and mounting bracket may be assembled on a door 22 mounted on the lower shell section 2 so as to provide access to the burner. The burner tube 19 is known as a ribbon burner and is provided with a continuous series of discharge ports directed toward the cage 14. Examples of such burners are found in U.S. Pat. Nos. 2,443,101 and 2,499,482. To control the burner and prevent the flame from being blown out, side bars 19a are provided as shown in FIGS. 5 and 6. The supply line 20 is suitably connected to a source of combustible gas and air, which is delivered to the burner orifices at a pressure above that existing in the shell section 2, whether the pressure in the shell section is above or below atmospheric pressure. Also, suitable conventional ignition means, not shown, is provided so that the burner may be remotely operated; that is, activated or deactivated in a conventional manner.

Operation of the lint disposal apparatus is as follows:

Simultaneously with or before particulate laden air is caused to move upwardly through the shell sections, the cage 14 is rotated and the burner is activated so that flame is directed progressively around the circumference of the cage. Upwardly flowing particulate laden air circulates about the screen in a spiraling, circular pattern as indicated by A in FIG. 11. When viewed axially, as in FIG. 12, the air and particulate matter appears to move almost tangently as indicated by B. This is due at least in part to the radial or centrifugal force produced by rotation of the screen 16, for if the screen is not rotated, the air paths appear to be radial.

A satisfactory rotational speed is approximately 30 RPM. The average circumference of the screen is approximately 12 feet. A screen of this circumference and rotational speed has a surface velocity of 6 feet approximately per second.

Due to the surface speed of the screen structure the particulate matter even as light as lint, when contacting the screen structure is subject to a centrifugal force. This is opposed by the radially component of force exerted by the air stream entering the screen structure. That such opposing forces do exist is evidenced by numerous eddy currents or small vortices, represented by the loops C shown in FIGS. 11 and 12, which has been observed in tests.

Evidence of the centrifugal force is further indicated by the fact that relatively large particulate material having increased mass, for example, hair pins, are thrown from the screen structure to the walls of the shell 2. This action is utilized to collect such particulate material in the cups 2a. It has been found that a single annular collector cup is not needed, due to the fact that such particulate material if not caught in a segmental cup will fall into the air stream and be repeatedly and randomly driven against the screen until finally falling into a cup.

The axially extending radially inwardly directed vanes 14a creates strong rotational movement of air within the screen structure which may cause some radial outflow of air contributing to the observed rotating eddy currents and suspension of the particulate matter.

Considering lint as an example, lint has an extremely high surface-to-weight ratio and thus, is readily maintained in a suspended state contiguous to the screen structure. Also, the lint has poor heat conductivity. As a result, the lint is consumed in the flame within an extremely small fraction of a second. More specifically, the spacing of the burner 19 is approximately three-fourths of an inch from the screen and the width of the main portion of the flame is approximately one-half inch wide; thus, if the screen surface is moving at 6 feet per second, the lint is exposed for a period of less than 1/100th of a second. Although the flame is directed toward the screen, which may be quite fine, and, therefore, formed of wire of extremely small diameter, nevertheless, its heat absorbing property is much greater than the lint. Therefore, even though the lint is raised to combustion temperature, the metal outer screen 16 does not rise to the combustion temperature of the lint. This is indicated by the fact that within a few inches from the burner, the rotating screen structure is cool enough to touch.

Referring to FIG. 6, a stripper tube 19b extends longitudinally with respect to the burner tube 19, and is provided with a plurality of nozzle ports or a nozzle slit 19C, directed essentially tangently in opposition to the direction of movement of the screen structure. It is customary to operate a drier for a period of time calculated to dry or partially dry its contents, then shut-off the drier for refill. On completion of the drying cycle, the burner and the blower are turned off. While the screen structure continues to rotate, air is jetted from the stripper 19 and caused to impinge on the surface of the screen structure in a direction opposite from rotational movement of the screen to cleanse the screen structure of ashes or other products of combustion. Such combustion products settle and may be collected in a collector, not shown, for removal.

While use of an open flame directed against the particulate matter is preferred, a source of radiant energy such as an electric heating element may be used.

Referring to FIG. 7. This construction shown diagrammatically is essentially the same as that shown in FIG. 1, except that the duct and housing sections extend horizontally.

Reference is now directed to FIGS. 8 and 9. In this case a cylindrical cage or screen structure 14b is provided and a lower shell section 2c which is tapered or conical. Still further, the lower end of the cylindrical cage 14b may be provided with an outwardly and upwardly directed collector flange 23. The annular trough formed by the collector flange receives the small amount of ash which may fall from the cage surface as well as non-inflammable particulate matter that may have been carried in the air stream. Except for its shape, the cage 14b is similar to the cage 14 in that it includes an inner screen 15 and an outer screen 16.

The embodiments shown in FIGS. 7 through 9 operate in the manner set forth in reference to the embodiment disclosed in FIGS. 1 through 4.

Having fully described my invention it is to be understood that I am not to be limited to the details herein set forth, but that my invention is of the full scope of the appended claims.

I claim:
1. An apparatus for the disposition of combustible particulate matter, contained in an air stream moving in a duct, said apparatus, comprising:
   a. a shell having a relatively coaxial inlet end and outlet end interposed in the duct with its inlet end and outlet end joined thereto;
   b. an annular filter screen structure closed at one end and extending longitudinally within the shell between its inlet end and outlet end, the screen structure defining with the shell an inlet chamber exteriorly of the filter screen structure, including its closed end, said inlet chamber communicating with the inlet end of the shell, and an outlet chamber interiorly of the filter screen structure and communicating with the outlet end of the shell;
   c. an annular seal means between the outlet end of the shell and the outlet chamber formed by the screen structure to close the inlet chamber whereby all flow of air through the duct passes through the filter screen structure, said annular seal means permitting rotation of the filter screen structure;
   d. means attached to an end of the screen structure for rotating the filter screen structure at sufficient surface speed to cause the air stream and entrained particulate matter, on approaching the filterscreen structure, to rotate therewith, the air stream flow and the surface speed of the filter screen structure being sufficient to exert a force continuously urging the particulate matter off the filter screen structure in opposition to air flow through the filter screen structure and cause the particulate matter to remain partially suspended in proximity to the surface of the filter screen structure;
   e. and a longitudinally extending heating means directed toward a narrow zone of the external surface of the filter screen structure and maintained at a temperature above the combustion temperature of the particulate matter thereby to burn off the particulate matter as the filter screen structure rotates past the heating means.

2. An apparatus as defined in claim 1, adapted for the disposal of particulate matter in the form of lint, and wherein:
   a. essentially noncombustible particulate material too large to enter the filter screen structure is caused to rebound from the filter screen structure toward the surrounding shell;
   b. and upwardly open means is disposed adjacent the shell in position to receive such material on random rebound from the screen structure.

3. An apparatus as defined in claim 1, wherein:
   a. the heating means is a burner producing a continuous robbon of flame.

4. An apparatus as defined in claim 1, wherein:
   a. a perforated air tube is disposed longitudinally of the filter screen structure for directing air tangentially with respect to the filter screen structure to clean the filter screen structure periodically of accumulated residue derived from the particulate matter.

5. An apparatus, as defined in claim 1, wherein:
   a. the filter screen structure includes a fine mesh screen outer lamination, a coarse mesh screen inner lamination, and a set of air circulating blades within the screen structure.

6. An apparatus, as defined in claim 1, wherein:
   a. the rotating means includes a motor disposed in coaxial relation with the shell;
   b. and an open end transverse tube is disposed transversely in the shell and receives the motor and isolates the motor from the flow of air passing through the shell.

7. An apparatus as defined in claim 1, wherein:
   a. the filter screen structure is vertically disposed, the lower end of the shell constitutes its inlet end;
   b. and a collector is disposed below the filter screen structure to receive particulate matter which may fall from the filter screen structure.

8. An apparatus as defined in claim 1, wherein:
   a. the inlet chamber diminishes in area from the inlet end of the shell toward the outlet end thereof.

9. An apparatus, as defined in claim 8, wherein:
   a. the filter screen structure is frusto-conical and tapers toward the inlet end of the shell.

10. An apparatus as defined in claim 9, wherein:
    a. the filter screen structure is cylindrical and the shell is frusto-conical.

* * * * *